US008838968B2

(12) United States Patent
Mankovski, Jr. et al.

(10) Patent No.: US 8,838,968 B2
(45) Date of Patent: Sep. 16, 2014

(54) SYSTEM AND METHOD FOR VIRTUAL MACHINE DATA PROTECTION IN A PUBLIC CLOUD

(75) Inventors: Serge Mankovski, Jr., Santa Clara, CA (US); Eitan Hadar, Nesher (IL)

(73) Assignee: CA, Inc., Islandia, NY (US)

( * ) Notice: Subject to any disclaimer, the term of this patent is extended or adjusted under 35 U.S.C. 154(b) by 2 days.

(21) Appl. No.: 13/470,395

(22) Filed: May 14, 2012

(65) Prior Publication Data
US 2013/0305046 A1  Nov. 14, 2013

(51) Int. Cl.
*H04L 9/32* (2006.01)
*G06F 17/30* (2006.01)

(52) U.S. Cl.
USPC .............................................. 713/168; 726/2

(58) Field of Classification Search
CPC ....... H04L 63/08; H04L 63/0428; H04L 9/08; H04L 9/32; H04L 9/3271
USPC ................ 713/167, 168, 169; 726/2; 709/232
See application file for complete search history.

(56) References Cited

U.S. PATENT DOCUMENTS

| | | | | |
|---|---|---|---|---|
| 6,029,168 | A * | 2/2000 | Frey | 1/1 |
| 6,112,255 | A * | 8/2000 | Dunn et al. | 710/7 |
| 6,256,673 | B1 * | 7/2001 | Gayman | 709/232 |
| 6,591,376 | B1 * | 7/2003 | VanRooven et al. | 714/36 |
| 6,674,884 | B2 * | 1/2004 | Bacus et al. | 382/133 |
| 7,162,452 | B1 * | 1/2007 | Epstein | 705/52 |
| 7,814,146 | B2 | 10/2010 | Chavez et al. | |
| 7,849,303 | B2 | 12/2010 | Miller | |
| 8,051,205 | B2 | 11/2011 | Roy et al. | |
| 8,073,926 | B2 | 12/2011 | Traut et al. | |
| 8,190,921 | B1 * | 5/2012 | Harwood et al. | 713/193 |
| 8,260,794 | B2 * | 9/2012 | Caceres | 707/758 |
| 2003/0169878 | A1 * | 9/2003 | Miles | 380/201 |
| 2007/0294676 | A1 * | 12/2007 | Mellor et al. | 717/139 |
| 2007/0300221 | A1 | 12/2007 | Hartz et al. | |
| 2008/0016387 | A1 * | 1/2008 | Bensinger | 714/4 |
| 2008/0144471 | A1 * | 6/2008 | Garapati et al. | 369/99 |
| 2009/0122724 | A1 | 5/2009 | Rosenberg | |
| 2009/0210697 | A1 | 8/2009 | Chen et al. | |
| 2009/0220090 | A1 | 9/2009 | Savagaonkar et al. | |
| 2009/0290709 | A1 * | 11/2009 | MacDonald et al. | 380/200 |
| 2009/0319502 | A1 | 12/2009 | Chalouhi et al. | |
| 2010/0094921 | A1 * | 4/2010 | Roy et al. | 709/201 |
| 2010/0095009 | A1 | 4/2010 | Matuszewski et al. | |
| 2010/0153749 | A1 * | 6/2010 | Sakai | 713/193 |
| 2010/0332456 | A1 | 12/2010 | Prahlad et al. | |
| 2011/0022574 | A1 | 1/2011 | Hansen | |
| 2011/0047380 | A1 * | 2/2011 | Miller | 713/168 |

(Continued)

OTHER PUBLICATIONS

Jinzhu Kong, "Protecting the Confidentiality of Virtual Machines against Untrusted Host," 2010 International Symposium on Intelligence Information Processing and Trusted Computing, © 2010 IEEE, pp. 364-368.

*Primary Examiner* — Abu Sholeman
(74) *Attorney, Agent, or Firm* — Baker Botts, LLP

(57) ABSTRACT

A method includes partitioning a disk image file into a plurality of segments. The method also includes generating a unique key for each segment, storing the unique keys in an image mapping file, and transmitting the image mapping file to a particular one of a plurality of nodes on a network. The method further includes transmitting a first segment and a second segment of the plurality of segments to different nodes of the plurality of nodes.

20 Claims, 2 Drawing Sheets

(56) References Cited

U.S. PATENT DOCUMENTS

| | | |
|---|---|---|
| 2011/0106758 A1* | 5/2011 | Agapiev et al. ............... 707/622 |
| 2011/0126197 A1 | 5/2011 | Larsen et al. |
| 2011/0173609 A1 | 7/2011 | Buragohain et al. |
| 2011/0179268 A1* | 7/2011 | Strom et al. .................. 713/156 |
| 2011/0179415 A1* | 7/2011 | Donnellan et al. ................. 718/1 |
| 2011/0246767 A1 | 10/2011 | Chaturvedi et al. |
| 2011/0246784 A1* | 10/2011 | Hobbett et al. ............... 713/189 |
| 2011/0246786 A1 | 10/2011 | Laor et al. |
| 2011/0282915 A1* | 11/2011 | Steer et al. ................... 707/802 |
| 2011/0289555 A1 | 11/2011 | DeKoenigsberg et al. |
| 2011/0296201 A1 | 12/2011 | Monclus et al. |
| 2011/0307533 A1* | 12/2011 | Saeki ........................... 707/822 |
| 2012/0030176 A1* | 2/2012 | Gelson et al. .................. 707/640 |
| 2012/0084262 A1* | 4/2012 | Dwarampudi et al. ....... 707/667 |
| 2012/0084445 A1* | 4/2012 | Brock et al. ................... 709/226 |
| 2012/0143688 A1* | 6/2012 | Alexander et al. ......... 705/14.54 |
| 2012/0179778 A1* | 7/2012 | DeSwardt et al. ............. 709/217 |
| 2012/0191969 A1* | 7/2012 | Clifford et al. ............... 713/150 |
| 2012/0290582 A1* | 11/2012 | Oikarinen ..................... 707/741 |
| 2012/0317275 A1* | 12/2012 | Lee et al. ...................... 709/224 |
| 2012/0317279 A1* | 12/2012 | Love et al. .................... 709/224 |
| 2013/0132523 A1* | 5/2013 | Love et al. .................... 709/219 |
| 2013/0132950 A1* | 5/2013 | McLeod et al. ................... 718/1 |

* cited by examiner

SYSTEM AND METHOD FOR VIRTUAL MACHINE DATA PROTECTION IN A PUBLIC CLOUD

TECHNICAL FIELD

The present disclosure relates generally to virtual machine data protection and more particularly to a system and method for securely storing virtual machine data in a public cloud.

BACKGROUND

Virtual machine data, such as virtual machine images, may be a target for unauthorized access to private data. In existing systems, virtual machine data belonging to a cloud customer may be required to reside in a cloud environment, where it may be vulnerable to attacks by cloud vendor personnel and/or other unauthorized users such as hackers. In addition, migration and/or re-provisioning of virtual machine data into different cloud environments may be cumbersome and time consuming.

SUMMARY

According to one embodiment of the present disclosure, a method includes partitioning a disk image file into a plurality of segments. The method also includes generating a unique key for each segment, storing the unique keys in an image mapping file, and transmitting the image mapping file to a particular one of a plurality of nodes on a network. The method further includes transmitting a first segment and a second segment of the plurality of segments to different nodes of the plurality of nodes.

Technical advantages of the present disclosure include the secure storage of virtual machine data in cloud environments. Particular embodiments may also allow for rapid migration and/or provisioning of virtual machine data from one cloud environment to another. Some embodiments may also allow for redundant storage of virtual machine data in cloud environments.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of certain embodiments of the present invention and features and advantages thereof, reference is now made to the following description taken in conjunction with the accompanying drawings, in which.

DETAILED DESCRIPTION OF EXAMPLE EMBODIMENTS

Figure 1:
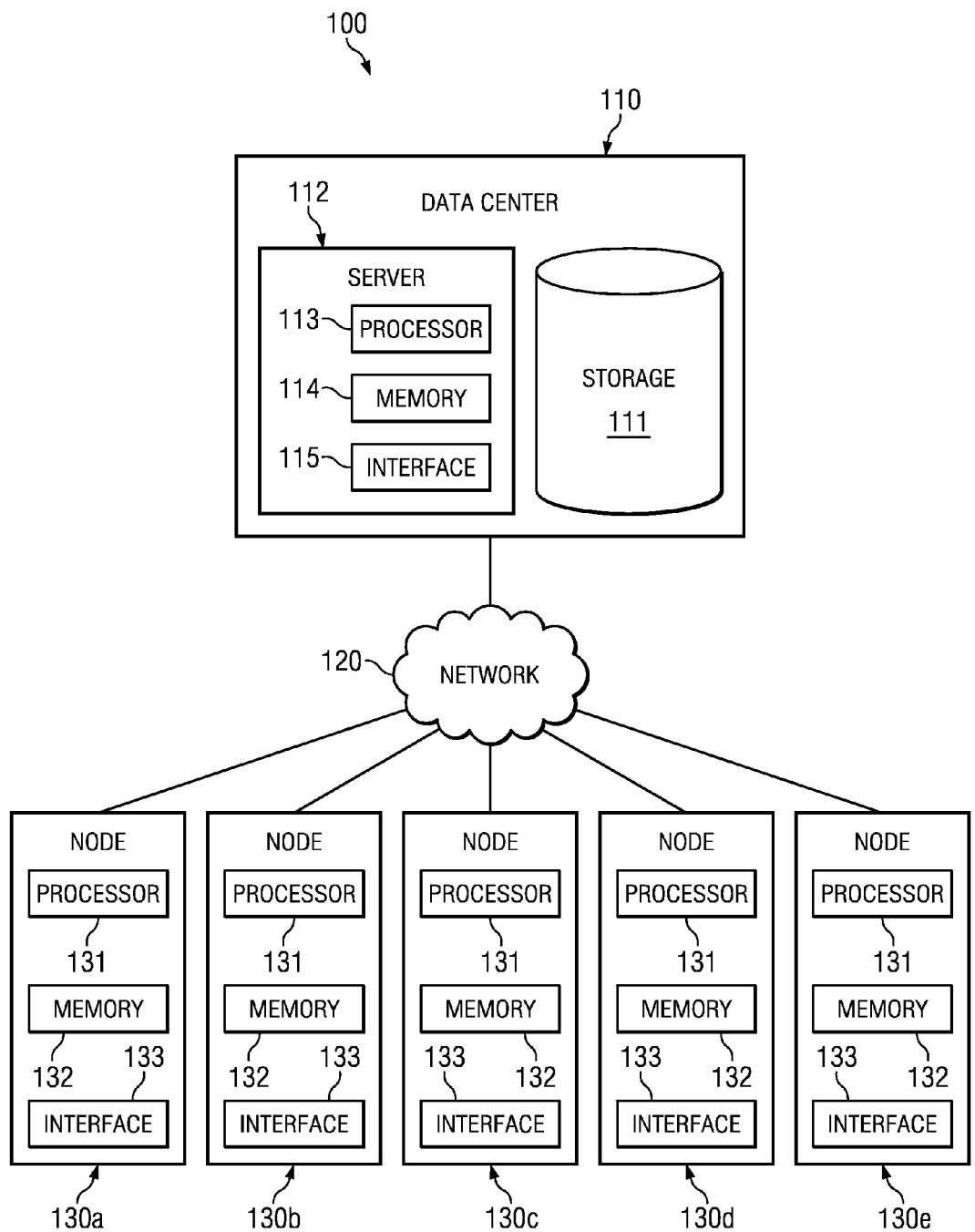
FIG. 1 illustrates an example cloud environment.
Figure 2:
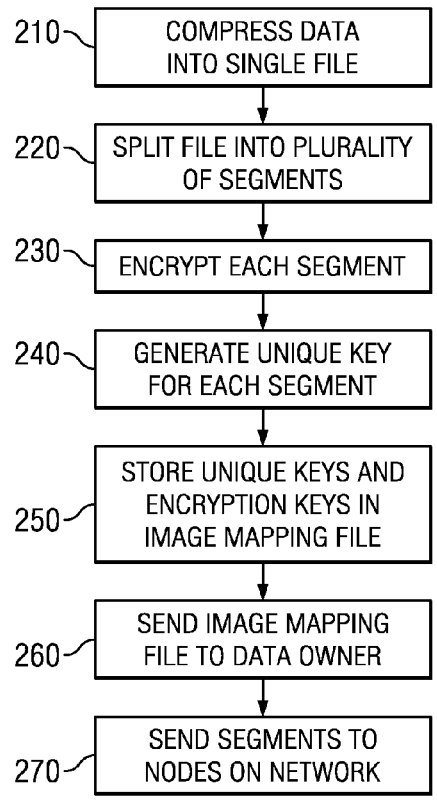
FIG. 2 illustrates an example method for storing virtual machine data.
Figure 3:
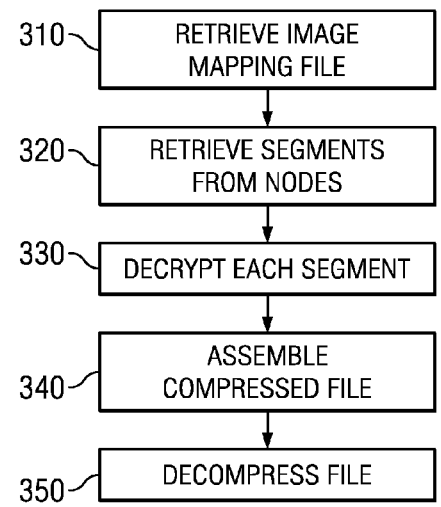
FIG. 3 illustrates an example method for recovering virtual machine data.

Embodiments of the present disclosure and its advantages are best understood by referring to FIGS. 1 through 3 of the drawings, like numerals being used for like and corresponding parts of the various drawings.

FIG. 1 illustrates an example cloud environment 100 that includes a datacenter 110, a network 120, and nodes 130, and may embody aspects of the present disclosure. Cloud environment 100 may be operable to provide cloud services to customers at nodes 130, such as shared software applications and/or other software services. In existing cloud environments, virtual machine data may be a target for unauthorized access to private data. For example, virtual machine data belonging to a cloud customer may be required to reside in the cloud environment, where it may be vulnerable to attacks by cloud vendor personnel and/or other unauthorized users such as hackers. In addition, migration and/or re-provisioning of virtual machine data into different cloud environments may be cumbersome and time consuming.

For instance, in existing systems, a user wishing to run a virtual machine in a cloud environment may be required to upload an initial virtual machine image to the cloud environment to instantiate the image. After using the instantiated virtual machine, the state of the virtual machine may have changed from that captured by the initial image uploaded to the cloud environment. If the user wishes to temporarily stop using the instantiated virtual machine, the user may store an updated image of the virtual machine in the cloud environment. However, the virtual machine image may be vulnerable to attacks and/or theft while being stored in the cloud environment. To alleviate this concern, some users may wish to download the updated virtual machine image from the cloud, store the image locally, and later upload the image when further use is desired. However, this may be inefficient and/or time-consuming, as downloading and uploading large amounts of data may take a substantial amount of time to perform in addition to the time required to re-instantiate and/or re-provision the image.

Some users may wish to migrate a virtual machine to a different cloud environment as well. In existing systems, this may require the user to migrate a new image capturing the updated state of the virtual machine from the current environment to the new environment. Alternatively, the user may upload the initial image to the new cloud environment and provision the image such that it mirrors the updated state of the virtual machine in the current environment. Either process may take a significant amount of time, however, and may be quite burdensome.

Accordingly, embodiments of the present disclosure may allow for secure storage of data in cloud environments. In addition, embodiments of the present disclosure may allow for the rapid migration or re-provisioning of images securely stored in the cloud. For instance, a virtual machine image file in a cloud environment may be partitioned into a plurality of segments. In some embodiments, the image file may be compressed prior to being partitioned into segments using any suitable data compression technique. Unique keys for each segment may then be generated, and may be used for location and/or identification purposes. For example, the unique keys may indicate the node on which each segment is located on a network.

The segments may then be distributed among various nodes coupled to a network. Such distributed storage of the segments may allow for secure storage of the virtual machine image, since each segment of data may not be particularly relevant to another user without the other segments of the virtual machine image. In addition, such distributed storage may allow for rapid recovery of the virtual machine image, as each segment may be retrieved in parallel from each of the nodes on the network without requiring a large amount of bandwidth from any one of the nodes. In particular embodiments, the segments may be replicated across the various nodes on the network according to any suitable replication technique. Such replication may provide redundancy protection in the event of data loss at one or more of the nodes on the network.

The segments may also be encrypted prior to distribution among the nodes. This may include generation of encryption keys for each segment being distributed on the network, which may be stored in an image mapping file (IMF) along with the unique keys. The IMF may then be stored and/or controlled by the owner of the virtual machine image, and/or may allow a user with control of or access to the file to retrieve and re-provision a virtual machine image file that has been distributed on the network.

The segments may be retrieved from the various nodes on the network when desired, for example, when the user wishes to re-provision the image in the cloud environment. In some embodiments, the segments may be retrieved according to the unique keys in the IMF. In particular embodiments, the segments may only be retrieved by a user with control of or access to the IMF. Once retrieved, the segments may be assembled to form the original virtual machine image file. If encrypted, the segments may be decrypted prior to assembly. If the assembled file is a compressed version of the image file, it may be decompressed to yield the original virtual machine image file.

As an example, referring to FIG. 1, a virtual machine image owned by a user of node 130a and located in datacenter 110 may be partitioned into a plurality of segments and distributed among the various nodes 130 connected to network 120. A unique key and encryption key may be generated for each segment, and each key may be stored in an IMF. The IMF may be stored at node 130a, the owner of the image file. When the owner of the image user of computer wishes to retrieve and re-instantiate the virtual machine image in datacenter 110, the segments may be retrieved from nodes 130 according to the keys in the IMF. The segments may then be assembled on server 112 and/or storage 111 to form the original virtual machine image. Once assembled, the virtual machine image may then be deployed in datacenter 110.

Datacenter 110 may refer to a collection of hardware resources such as a server 112 and/or storage 111. Server 112 includes a processor 113, memory 114, and an interface 115. Processor 113 may refer to any suitable device operable to execute instructions and manipulate data to perform operations for server 112. Processor 113 may include, for example, any type of central processing unit (CPU).

Memory 114 may comprise one or more tangible, computer-readable, and/or computer-executable computer readable medium, and may store data, information, and/or instructions operable to be executed by processor 113. Examples of memory include computer memory (for example, Random Access Memory (RAM) or Read Only Memory (ROM)), mass computer readable media (for example, a hard disk), removable computer readable media (for example, a Compact Disk (CD) or a Digital Video Disk (DVD)), and/or other computer-readable medium.

Interface 115 may refer to any suitable device operable to receive input for server 112, send output from server 112, perform suitable processing of the input or output or both, communicate to other devices, or any combination of the preceding. Interface 115 may include appropriate hardware (e.g. modem, network interface card, etc.) and software, including protocol conversion and data processing capabilities, to communicate through a LAN, WAN, or other communication system that allows server 112 to communicate to other devices. Interface 115 may include one or more ports, conversion software, or both.

Storage 111 may provide additional data storage capacity and may include database and/or network storage, or any other suitable tangible, computer-readable storage media. In certain embodiments, storage 111 may include network resources, such as a storage area network (SAN) or network-attached storage (NAS).

Network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise internet, or any other suitable communication link, including combinations thereof. Network 120 may connect a plurality of nodes 130.

Nodes 130, like server 112, may include a processor 131, memory 132, and interface 133. As an example, and not by way of limitation, nodes 130 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, nodes 130 may include one or more computer systems; be unitary or distributed; span multiple locations; span multiple machines; or reside in a cloud, which may include one or more cloud components in one or more networks.

FIG. 2 illustrates an example method for storing virtual machine data. The method begins at step 210, where the virtual machine data is compressed into a single file. Compression may be accomplished using any suitable data compression technique. In particular embodiments, the data may comprise a disk image and/or an archive file, which may include the data contents of every written sector of a disk along with the disk file system. For example, the data may include the source volume and/or medium information, file directory structure, error detection and recovery information, and/or file comments. In certain embodiments, the virtual machine data may comprise a virtual machine image.

At step 220, the compressed file is split or partitioned into a plurality of data segments, which may comprise the various partitions of the compressed file. The number of data segments may be any suitable number. In some embodiments, the number of segments may be chosen such that each segment may be of little value without the rest of the segments. This may allow for more secure storage of each segment, since an unauthorized user would require access to every segment in order to use and/or view the data. In certain embodiments, the number of segments may be chosen based on the preferred size of each segment. For instance, a size of 1 MB to 64 MB per segment may be chosen based on disk sector sizes available for storage.

At step 230, each segment is encrypted. Encryption may be performed using any suitable encryption technique. During this step, encryption keys may be generated according to the encryption technique selected. In some embodiments, an encryption key may be generated for each segment. After encryption, a unique key is then generated for each segment at step 240. In some embodiments, the unique key may identify the particular segment to which it corresponds. In some embodiments, the unique may identify a location at which the segment is to be stored. In particular embodiments, the unique key may be generated according to a hash function.

At step 250, the encryption keys and unique keys are stored in an image mapping file (IMF). In particular embodiments, the IMF may comprise a distributed hash table (DHT) containing unique key and segment pairs, which may indicate a location of each segment on the network. In such embodiments, the DHT may provide a lookup service similar to a hash table, and may utilize the unique keys to locate each segment on the network.

At step 260, the IMF is sent to a particular one of a plurality of nodes on a network. In some embodiments, the particular node may be the owner of the virtual machine data. In some embodiments, having possession of the IMF for a particular archive file may allow a user to recover the archive file at a later time. In further embodiments, possession of the IMF containing the unique keys and encryption keys may be required to retrieve each segment from the nodes on the network.

Finally, at step 270, the plurality of segments are sent to a plurality of nodes on a network. In some embodiments, the plurality of nodes may include the node to which the IMF was sent. In other embodiments, the plurality of nodes may not include the node to which the IMF was sent. In particular embodiments, the segments may be distributed according to the BitTorrent protocol, or other similar P2P protocol. In certain embodiments, the plurality of segments may be replicated among the plurality of nodes for redundancy purposes using any suitable data replication technique.

FIG. 3 illustrates an example method for recovering virtual machine data. At step 310, the IMF is retrieved. In some embodiments, the IMF may be stored at a the node initiating the virtual machine data recovery. In other embodiments, the IMF may be stored at a different node from the node initiating the virtual machine data recovery.

At step 320, the plurality of segments are retrieved from the plurality of nodes. In some embodiments, the segments may be retrieved based on the unique keys in the IMF. For example, in embodiments where the IMF comprises a DHT, the unique key and segment pairs may indicate the location of the segments on the network. In particular embodiments, the segments may be retrieved from the nodes in parallel. In some embodiments, the segments may be retrieved from the nodes in a particular order.

At step 330, each segment is decrypted. In particular embodiments, the segments may be decrypted based on the encryption keys in the IMF. Once each segment is decrypted, the archive file is assembled at step 340 and then decompressed at step 350, yielding the original virtual machine data in unencrypted and uncompressed form.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed:

1. A method, comprising:
   partitioning a disk image file into a plurality of segments, the disk image file being associated with a first node of a plurality of nodes on a network;
   generating a unique key for each segment;
   storing the unique keys in an image mapping file;
   transmitting the image mapping file to the first node based on the association between the first node and the disk image file;
   transmitting a first segment of the plurality of segments to a second node of the plurality of nodes and a second segment of the plurality of segments to a third node of the plurality of nodes, the second and third nodes being different from the one or more first node; and
   associating a location of the first segment with the unique key of the first segment, and a location of the second segment with the unique key of the second segment.

2. The method of claim 1, further comprising compressing the disk image file.

3. The method of claim 1, further comprising:
   encrypting each segment;
   generating an encryption key for each segment; and
   storing the encryption keys in the image mapping file.

4. The method of claim 1, wherein generating a unique key for each segment comprises generating a unique key based on a hash function, and wherein the image mapping file comprises a distributed hash table.

5. The method of claim 1, wherein the disk image file comprises a virtual machine image.

6. The method of claim 1, further comprising replicating the plurality of segments across the plurality of nodes on the network.

7. The method of claim 1, further comprising:
   retrieving the image mapping file;
   retrieving the plurality of segments from the plurality of nodes based on the unique keys in the image mapping file; and
   generating the disk image file from the plurality of segments.

8. A system, comprising:
   a memory; and
   one or more processors operable to:
      partition a disk image file into a plurality of segments, the disk image file being associated with a first node of a plurality of nodes on a network;
      generate a unique key for each segment;
      store the unique keys in an image mapping file;
      transmit the image mapping file to the first node based on the association between the first node and the disk image file;
      transmit a first segment of the plurality of segments to a second node of the plurality of nodes and a second segment of the plurality of segments to a third node of the plurality of nodes, the second and third nodes being different from the one or more first node; and
      associate a location of the first segment with the unique key of the first segment, and a location of the second segment with the unique key of the second segment.

9. The system of claim 8, wherein the processors are further operable to compress the disk image file.

10. The system of claim 8, wherein the processors are further operable to:
    encrypt each segment;
    generate an encryption key for each segment; and
    store the encryption keys in the image mapping file.

11. The system of claim 8, wherein the processors operable to generate a unique key for each segment are further operable to generate a unique key based on a hash function, and wherein the image mapping file comprises a distributed hash table.

12. The system of claim 8, wherein the disk image file comprises a virtual machine image.

13. The system of claim 8, wherein the processors are further operable to replicate the plurality of segments across the plurality of nodes on the network.

14. The system of claim 8, wherein the processors are further operable to:
- retrieve the image mapping file;
- retrieve the plurality of segments from the plurality of nodes based on the unique keys in the image mapping file; and
- generate the disk image file from the plurality of segments.

15. A non-transitory computer readable medium comprising instructions that, when executed by a processor, are operable to:
- partition a disk image file into a plurality of segments, the disk image file being associated with a first node of a plurality of nodes on a network;
- generate a unique key for each segment;
- store the unique keys in an image mapping file;
- transmit the image mapping file to the first node based on the association between the first node and the disk image file;
- transmit a first segment of the plurality of segments to a second node of the plurality of nodes and a second segment of the plurality of segments to a third node of the plurality of nodes, the second and third nodes being different from the one or more first node and
- associate a location of the first segment with the unique key of the first segment, and a location of the second segment with the unique key of the second segment.

16. The computer readable medium of claim 15, wherein the instructions are further operable to compress the disk image file.

17. The computer readable medium of claim 15, wherein the instructions are further operable to:
- encrypt each segment;
- generate an encryption key for each segment; and
- store the encryption keys in the image mapping file.

18. The computer readable medium of claim 15, wherein the instructions operable to generate a unique key for each segment are further operable to generate a unique key based on a hash function, and wherein the image mapping file comprises a distributed hash table.

19. The computer readable medium of claim 15, wherein the instructions are further operable to replicate the plurality of segments across the plurality of nodes on the network.

20. The computer readable medium of claim 15, wherein the instructions are further operable to:
- retrieve the image mapping file;
- retrieve the plurality of segments from the plurality of nodes based on the unique keys in the image mapping file; and
- generate the disk image file from the plurality of segments.

* * * * *